United States Patent [19]

Custeau

[11] Patent Number: 4,714,279
[45] Date of Patent: Dec. 22, 1987

[54] EXHAUST PIPE COUPLER

[76] Inventor: Lincoln Custeau, 404 Notre-Dame Sud, Robertsonville, Quebec, Canada, G0N 1L0

[21] Appl. No.: 925,963
[22] Filed: Nov. 3, 1986
[51] Int. Cl.⁴ ............................................. F16L 33/00
[52] U.S. Cl. ...................................... 285/239; 285/238; 285/251
[58] Field of Search ..................... 285/3, 4, 7, 239, 238, 285/251, 240, 177, 235; 138/89, 89.1, 89.2, 89.4, 96 R

[56] References Cited

U.S. PATENT DOCUMENTS

| | | | |
|---|---|---|---|
| 2,495,092 | 1/1950 | Cox et al. | 285/238 |
| 2,528,332 | 10/1950 | Bergquist | 29/525 |
| 2,754,138 | 7/1956 | Kramer | 285/239 |
| 3,167,330 | 1/1965 | Draudt | 285/7 |
| 3,248,133 | 4/1966 | Michnoff | 285/238 |
| 3,288,497 | 11/1966 | Nydam | 285/177 |
| 3,349,805 | 10/1967 | Fried | 285/3 |
| 3,408,091 | 10/1968 | Zylstra | 285/7 |
| 3,926,458 | 12/1975 | Dryden | 285/177 |
| 3,995,888 | 12/1976 | McIlroy | 285/4 |
| 4,318,547 | 3/1982 | Erickson | 285/3 |
| 4,329,857 | 5/1982 | Kittle et al. | 138/89 |
| 4,383,692 | 5/1983 | Proctor | 285/177 |
| 4,395,800 | 8/1983 | Shindelaar | 138/89 |
| 4,483,371 | 11/1984 | Susin | 138/89.2 |

FOREIGN PATENT DOCUMENTS

| | | | |
|---|---|---|---|
| 589978 | 1/1960 | Canada | 285/177 |
| 1234463 | 2/1967 | Fed. Rep. of Germany | 285/7 |

Primary Examiner—Randolph A. Reese
Assistant Examiner—Anthony Knight

[57] ABSTRACT

A coupler for releasably connecting an evacuation hose to the exhaust or tail pipe of a motor vehicle to prevent accidental removal of the hose. The coupler comprises a cylindrical rubber body having one end sealingly releasably screwed to the hose and a flexible annular wall partially closing its other end. Radial slits are made through the annular wall which thus defines flexible, resilient triangular flaps. These flaps are provided with radial spacer ribs at their interior and exterior faces. When the body is slipped onto the tail pipe, the flaps are bent inwardly and their exterior ribs frictionally engage the tail pipe. If the body is subsequently pulled to a limited extent the flaps may reverse their bent position but still frictionally engage the pipe by their interior ribs. The flow of combustion gases creates a venturi effect in the main body which induces into the body drafts of ambient air between the the spacer ribs and around the pipe thereby constituting a pressure barrier against escape of combustion gases into the ambient air, and also effecting cooling of the body and of its flaps to prevent heat damage thereto.

12 Claims, 11 Drawing Figures

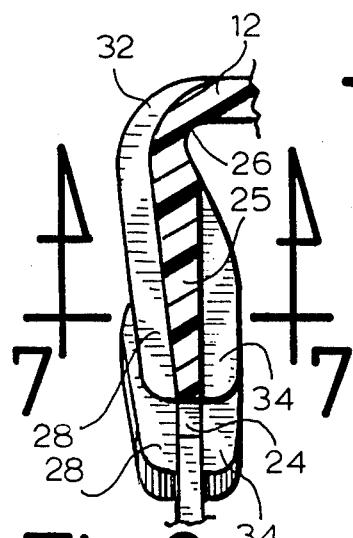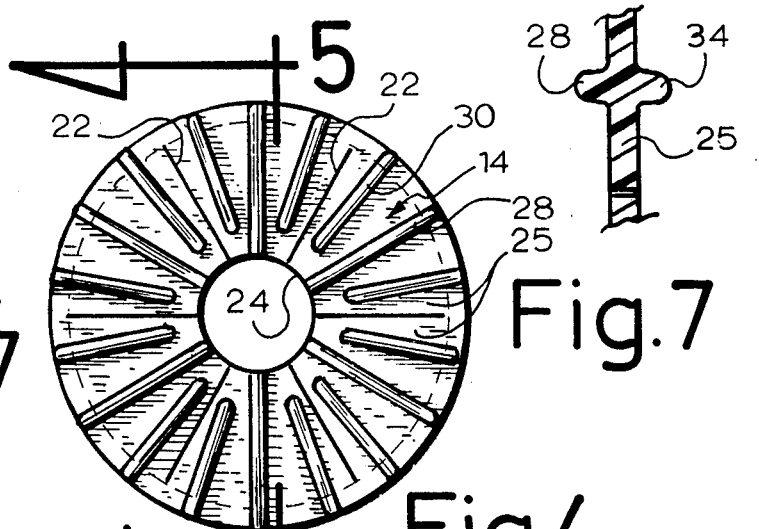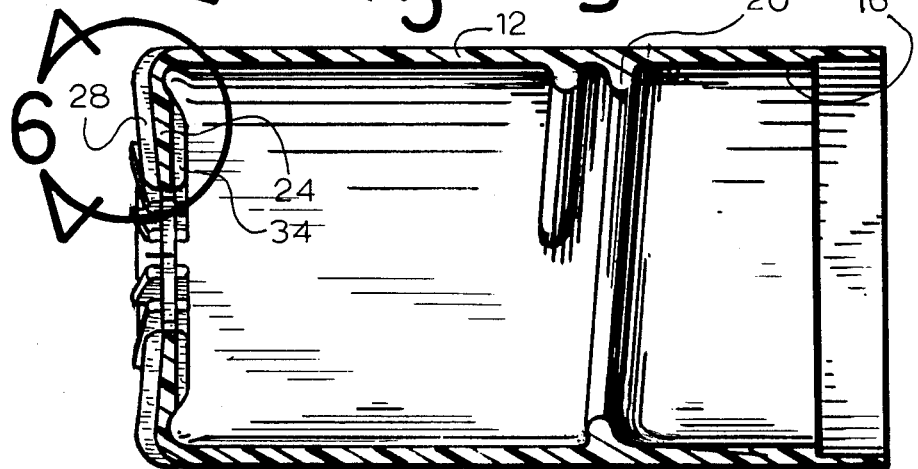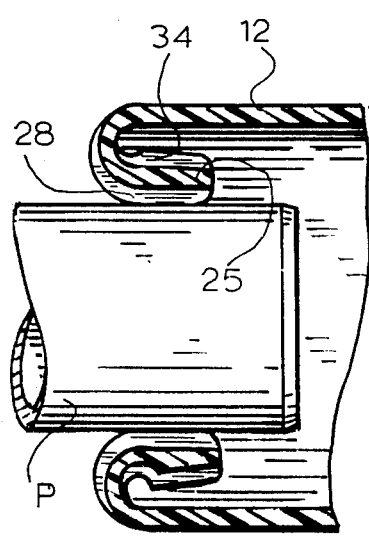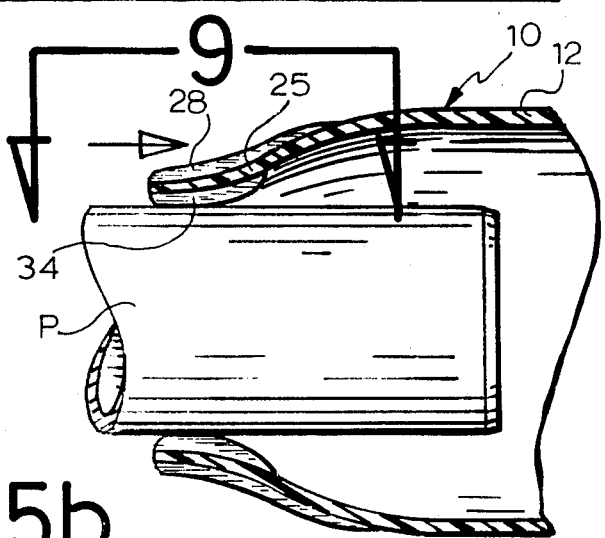

EXHAUST PIPE COUPLER

FIELD OF THE INVENTION

This invention relates to coupling devices, and more specifically, to a coupler for frictionally interconnecting a motor vehicle exhaust or tail pipe and a rubber hose.

BACKGROUND OF THE INVENTION

In countries where winter is cold, such as Canada, mechanics in motor vehicle repair shops need to work inside a heated closed garage, often having only minimal ventilation means. In a closed garage, when a mechanics works on a motor vehicle having its engine running, it is essential that the combustion gases be brought to the outside of the garage, otherwise, the mechanics would become intoxicated by carbon monoxide.

Usually, this evacuation is effected by simply slipping an elongated rubber hose at one end onto the motor vehicle exhaust pipe, and extending the opposite end portion of the rubber hose under or through a hole in the garage door.

An accidental slight pull will cause the rubber hose to disengage from the exhaust pipe and combustion gases will escape into the garage. Even when the rubber hose remains connected to the metal exhaust pipe, some combustion gases may find their way out from the inner mouth of that rubber hose, into the garage. The rubber hose may also deteriorate by melting at its portion in direct contact with the hot tail pipe.

OBJECTS OF THE INVENTION

The general object of the invention is to provide a coupler for fixedly releasably interconnecting a motor vehicle exhaust pipe to an evacuation rubber hose, said coupler preventing accidental uncoupling of the hose.

Another object of the invention is that said coupler be adaptable to rubber hoses of various diameters.

Another object of the invention is that said coupler be adaptable to tail pipes of various diameters.

A further object of the invention is that said coupler be able to withstand the heat generated by the tail pipe so as to be long-lasting.

Still another object of the invention is that said coupler prevents gas escape when the motor vehicle engine is running.

A corollary object of the present invention is to substantially increase safety in working conditions of mechanics, and especially, quality of air about a motor vehicle under repair in a closed garage.

SUMMARY OF THE INVENTION

There is disclosed a coupler for releasably frictionally interconnecting an evacuation hose to the exhaust pipe of a motor vehicle to prevent accidental removal of the hose. This coupler also prevents the escape of combustion gases to ambient air when the vehicle engine is running. The coupler comprises a cylindrical body of a diameter larger than the maximum diameter of the exhaust pipe to be fitted within the body. This body has a mouth at one end sealingly connected to one end of the evacuation hose and a flexible annular wall at its other end. This annular wall defines a central opening of smaller diameter than the minimum diameter of said exhaust pipe. Radial slits are made through said annular wall and extend to said opening to define sector shape flexible resilient flaps. The flaps further include spacer members on its exterior face.

When the body is slipped onto the tail pipe, the flaps are bent inwardly and their spacer members frictionally engage the tail pipe. Preferably, additional spacer members protrude from the interior face of the flaps. Therefore, if the body is pulled to a limited extent, away from the tail pipe, the flaps will reverse their bent position and these interior spacer members will still frictionally engage the pipe. In both positions, the flaps themselves are kept spaced from the pipe.

BRIEF DESCRIPTION OF THE DRAWINGS

FIG. 4 is an end view of the coupler annular end wall;

FIG. 5 is a longitudinal sectional view of the coupler taken along line 5—5 of FIG. 4;

FIGS. 5a and 5b are longitudinal sectional views of the left portion of FIG. 5, but further showing an exhaust pipe engaged in the coupler in two different but equally operative positions;

FIG. 6 is a partial enlarged sectional view taken within area 6 of FIG. 5;

FIG. 7 is a cross-sectional view taken along line 7—7 of FIG. 6, at a slightly reduced scale;

DETAILED DESCRIPTION OF THE EMBODIMENTS OF THE INVENTION

Figure 1:
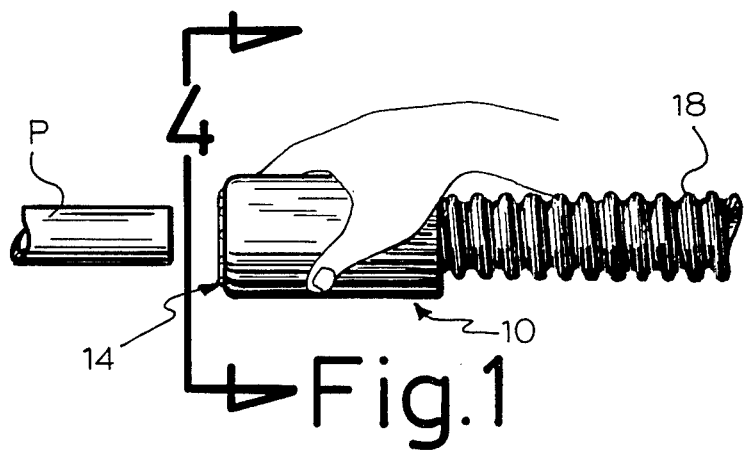
FIG. 1 is an elevation of a first embodiment of the coupler of the invention, held by a user's hand, and connected at one end to a rubber hose and proximate to an exhaust pipe at its end.
Figure 2:
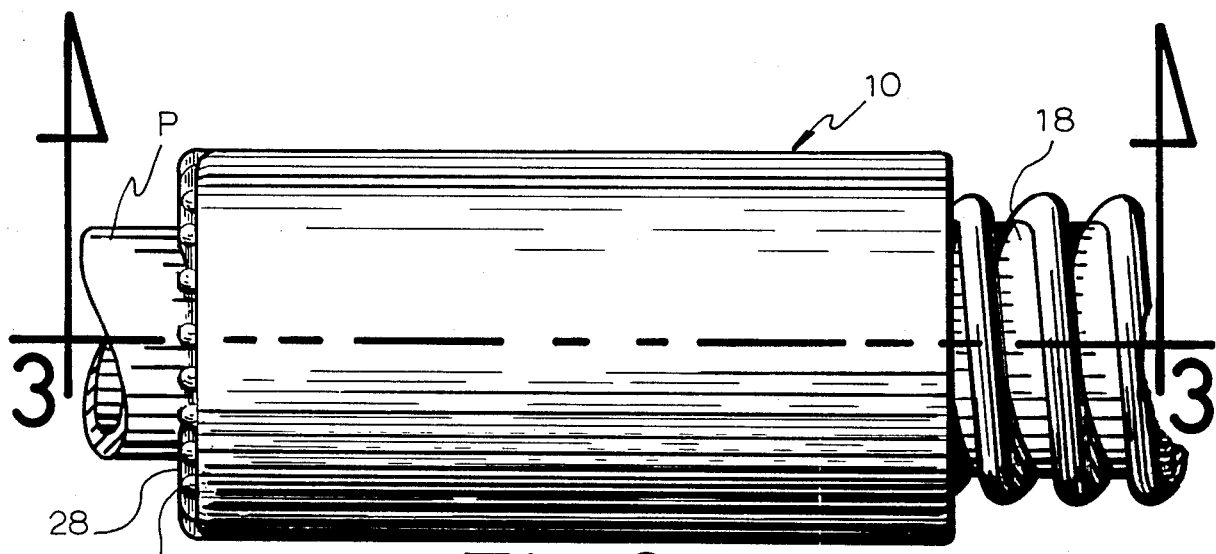
FIG. 2 is an enlarged elevation of FIG. 1, but with the coupler connected to the exhaust pipe.

The first embodiment of the coupler is shown in FIGS. 1 to 7, and 9, and is denoted 10. Coupler 10 is moulded in one piece from elastomeric material such as natural or synthetic rubber. It consists of a cylindrical body 12 partially closed at one end by an annular wall 14 and fully opened at its other end to form a mouth 16. A conventional flexible rubber hose 18 of the helical type and diametrically smaller than body 12 is adapted to be fitted within the mouth 16 and to be screwed therein by engaging helical screw threads 20 protruding inwardly from the cylindrical wall of body 12. Screw threads 20 may preferably extend through about one and a half turn. These evacuation hoses 18 are of conventional construction and are of usually one standard diameter. The annular wall 14 is provided with a plurality of radial slits 22 made therethrough and opening into the central hole 24 of annular wall 14. These slits define therebetween a plurality of sector shape flaps 25 which are resilient and flexible either inwardly or outwardly of body 12. As shown in FIG. 6, the thickness of each flap 25 preferably progressively decreases in the direction of hole 24. The junction of each flap 25 with the cylindrical body 12 is preferably of reduced thickness as shown at 26 to facilitate flexing of the flaps 25. The central hole 24 of annular wall 14 is of a diameter which is smaller than the smallest exhaust pipe diameter of motor vehicles normally found on the market, and the internal diameter of the body 12 is larger than the largest size exhaust pipes on the market.

Figure 3:
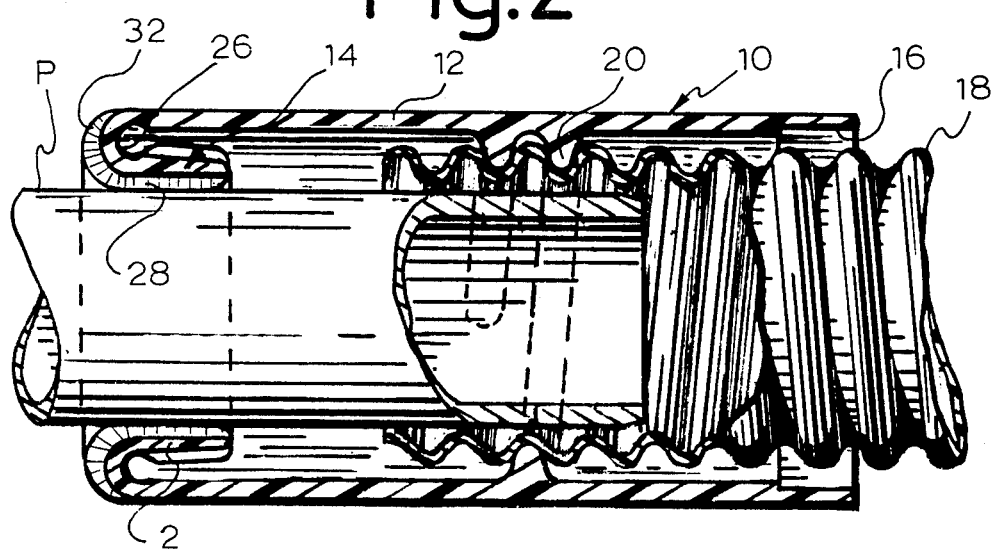
FIG. 3 is a longitudinal partly sectional view taken along line 3—3 of FIG. 2.

Thus, when the coupler 10 is pushed over an exhaust pipe such as shown at P in FIG. 3, the flaps 25 will bend inwardly within body 12.

Spacer members are formed on the external surface of the flaps 25. In the embodiment shown, these spacer members consist of radial ribs 28 and 30 protruding from each flap 25. As shown in FIG. 4, there is provided for each flap 25 a central longer rib 28 and on each side thereof a shorter rib 30. Longer ribs 28 terminate at the central hole 24 while shorter ribs 30 terminate short of this central hole. All the ribs 28, 30, extend on the external surface of the body 12; their outer end portions progressively merge with said external surface as shown as 32.

Preferably, there are similar ribs protruding from the internal surface of each flap 25. These internal ribs have generally the same arrangement as the external ribs 28 and 30. FIG. 6 shows an internal rib 34 which corresponds to the longer rib 28 and is in registry therewith. The shorter ribs corresponding to the external shorter ribs 30 are not shown. They are of the same length as ribs 30 and are in registry therewith. All the internal ribs progressively merge at their radially outer end with the inner surface of the reduced thickness junction 26 as shown in FIG. 6.

As shown in FIGS. 5a and 5b, when the body 12 is slipped onto the tail pipe, the flaps 25 are bent inwardly and their exterior ribs 28 and 30 frictionally engage the tail pipe. If the body is subsequently pulled to a limited extent, the flaps will reverse in their bent position as shown in FIG. 5b and then the exterior ribs 34 and outer ribs corresponding to the shorter ribs 30 will frictionally engage the pipe P. In both cases, air channels are formed between the ribs and longitudinally of the exhaust pipe P. Therefore, when the engine of the motor vehicle is running, the exhaust gases emerging from the tail pipe P produce a venturi effect which suck the ambient air between the ribs into the body. Therefore, the exhaust gases will not escape into the ambient air of the garage. The ribs resiliently contact the exhaust pipe P with sufficient force so that the evacuation hose 18 will not become accidentally disconnected from the exhaust pipe P.

Obviously, the ribs 28, 30, 34 could be replaced by other types of spacer members such as spaced studs or the like. These ribs or other types of spacer members also allow the ambient air to cool the coupler 10 and thus heat damage to the coupler is prevented. Obviously, the coupler could be made an integral part of one end of the evacuation hose 18.

Figure 8:
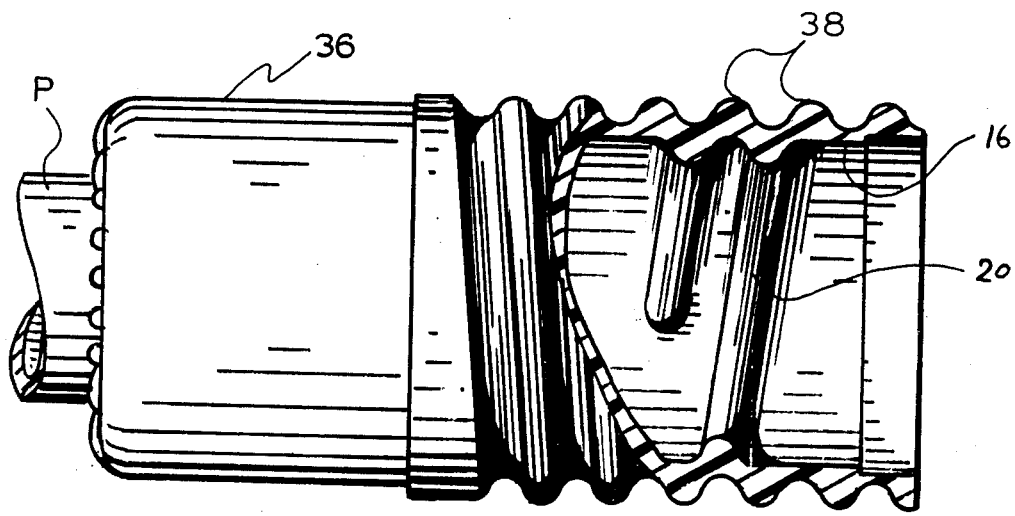
FIG. 8 is a partially sectional elevation of a second embodiment of a coupler according to the invention, shown connected to an exhaust pipe and at the scale of FIG. 2.
Figure 9:
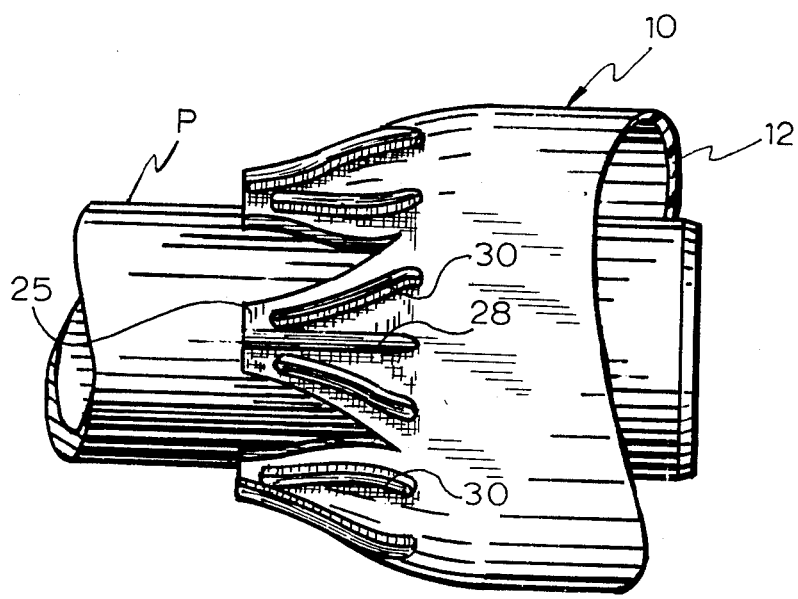
FIG. 9 is a slightly enlarged fragmentary elevation, taken along lines 9 of FIG. 5b.

FIG. 8 shows a modified embodiment of the coupler generally shown at 36 which has all the characteristics of the first embodiment as far as the means for engaging the exhaust pipe P is concerned but which has been modified at its mouth end portion 16' by the provision of external screw threads 38 in addition to the internal screw threads 40, the latter corresponding to the internal screw threads 20 of the first embodiment. The coupler 36 may thus be connected to evacuation hoses of two standard diameters. The smaller diameter evacuation hose will enter within the coupler body and be screwed by means of the internal screw threads 40. The larger diameter hose will fit around the coupler body and be screwed thereon by the external screw threads 38.

What I claim is:

1. A coupler for releasably connecting an evacuation hose to the exhaust pipe of a motor vehicle, comprising a cylindrical body having one end adapted to be sealingly connected to one end of said evacuation hose and a flexible annular wall partially closing the other end of said body, a central hole defined by said annular wall having a diameter which is smaller than the minimum diameter of the exhaust pipe to be fitted within said body, the internal diameter of said body being larger than the maximum diameter of an exhaust pipe to be fitted within said body, said annular wall having radial slits extending therethrough and to said hole to define generally sector-shape flexible resilient flaps, and further including spaced first spacer members protruding from the exterior face of said flaps wherein when said body is slipped onto an exhaust pipe the flaps are bent inwardly and said spacer members frictionally engage said exhaust pipe whereby said first spacer members define air channels therebetween and between said flaps and the exterior wall of said exhaust pipe, said air channels operatively interconnecting the interior of said cylindrical body with exterior ambient air for free through-flow ventilating circulation of air substantially longitudinally of said exhaust pipe.

2. A coupler as defined in claim 1 wherein said first spacer members consist of radially-extending ribs integrally formed at the outer face of said flaps.

3. A coupler as defined in claim 1, further including second spacer members protruding from the interior face of said flaps and spaced from each other and adapted to frictionally contact said exhaust pipe when said flaps are bent outwardly of said body, said second spacer members defining corresponding air channels similar to said first spacer members air channels.

4. A coupler as defined in claim 3, wherein said second spacer members consist of radial ribs protruding from the inner surface of said flaps.

5. A coupler as defined in claim 1, further including screw threads at said one end of said cylindrical body for screw threaded releasable engagement of an evacuation hose having a ribbed wall of helical type.

6. A coupler as defined in claim 5, wherein said screw threads are formed at the inside surface of said cylindrical body for engaging the helical ribs of an evacuation hose inserted within said body.

7. A coupler as defined in claim 5, wherein said screw threads include first screw threads formed at the internal surface of said cylindrical body and second screw threads protruding from the external surface of said cylindrical body, said second screw threads adapted to engage the ribs of an evacuation hose fitted around said cylindrical body.

8. A coupler as defined in claim 6, wherein said screw threads longitudinally extend for about one and a half turn along said cylindrical body.

9. A coupler as defined in claim 7, wherein said screw threads extend longitudinally for about one and a half turn along said cylindrical body.

10. A coupler as defined in claim 1, wherein the thickness of each of said flaps is progressively-radially-inwardly decreasing.

11. A coupler as defined in claim 10, wherein the thickness of each of said flaps is smallest at the junction of each flap with the cylindrical body.

12. A coupler for releasably connecting a tube to a diametrally-smaller pipe from which a hot pressurized fluid escapes; said coupler defining a cylindrical body opened at one end and partially closed at the other end by a circular end wall made of a flexible material; sealing means, to sealingly connect one end portion of said tube to an intermediate section of said cylindrical body; said cylindrical body circular end wall being provided with radial slits defining sector-shaped flaps therebetween, said circular end wall having a central through-bore into which open said radial slits, said through-bore diametrally smaller than said pipe; and small spaced radially-extending projections depending from the exterior face of said flaps; whereby, when one end portion of said pipe is pushed through said end wall into said cylindrical body, said flaps become inwardly bent, and are kept spaced from said tube by said projections whereby said projections thus defining air channels operatively interconnecting the interior of said cylindrical body with exterior ambient air along a path substantially longitudinally of said pipe; the pressurized fluid escaping from said pipe producing a Venturi effect which prevents backflow escape of said pressurized fluid through said air channels into ambient air.

* * * * *